Sept. 11, 1951     J. D. MAXWELL     2,567,293
DARKROOM CAMERA
Filed May 19, 1949

INVENTOR.
John D. Maxwell
BY
Morgan, Finnegan & Durham
ATTORNEYS.

Patented Sept. 11, 1951

2,567,293

UNITED STATES PATENT OFFICE 2,567,293

DARKROOM CAMERA

John D. Maxwell, Glen Head, N. Y., assignor to Powers Photo Engraving Company, Glen Cove, N. Y., a corporation of New York Application May 19, 1949, Serial No. 94,127

2 Claims. (Cl. 88—24)

The present invention relates to a novel and improved camera, such as one used in the preparation of negatives for use in making half tone printing plates, and more particularly to mechanism associated with such a camera by which the camera elements may be relatively adjusted to secure a desired size, accurately focused reproduction.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present invention has for its object the provision of focusing mechanism which is readily accessible to the operator, sensitive and highly accurate in its movements and relatively simple and easy to operate rapidly. A further object is the provision of focusing mechanism which may be so arranged as to permit a great range of movement of the lens housing and copy or subject support whereby maximum enlargements or reductions of the subject may be made. Another object is to provide a mechanism which may be sufficiently rugged in construction to maintain accurate alignment when used in large cameras yet permit easy and smooth operation for both coarse and fine adjustment by virtue of a minimum of friction.

The camera of the present invention preferably comprises a fixed housing at the rear for containing and adjustably supporting a sensitized element to record an image and for supporting a ground glass for observing the image. A second housing is provided in the mid-section of the camera for mounting a lens and associated aperture adjusting means. The sensitized element housing and the lens housing are interconnected by the usual bellows. A copy or subject frame is provided in front of the lens housing whereby copy to be photographically reproduced may be supported normal to the lens axis. The lens housing and copy frame are slidably mounted on common supports and arranged to slide thereon relative to each other and to the sensitized element housing.

Independent adjusting means are provided for manual operation to properly position the lens housing and the copy frame and comprise two hand wheels at the rear of the camera and crank operated mechanism associated with the lens housing and the copy frame. A coarse adjustment of lens and copy position may be obtained by rotation of the cranks associated with the lens housing and copy frame and a final fine adjustment is obtained by rotation of the hand wheels at the rear of the camera while the operator is viewing the image on the ground glass.

It will be understood that the foregoing general description and the following detailed description as well are exemplary and explanatory of the invention but are not restrictive thereof.

Figure 1:
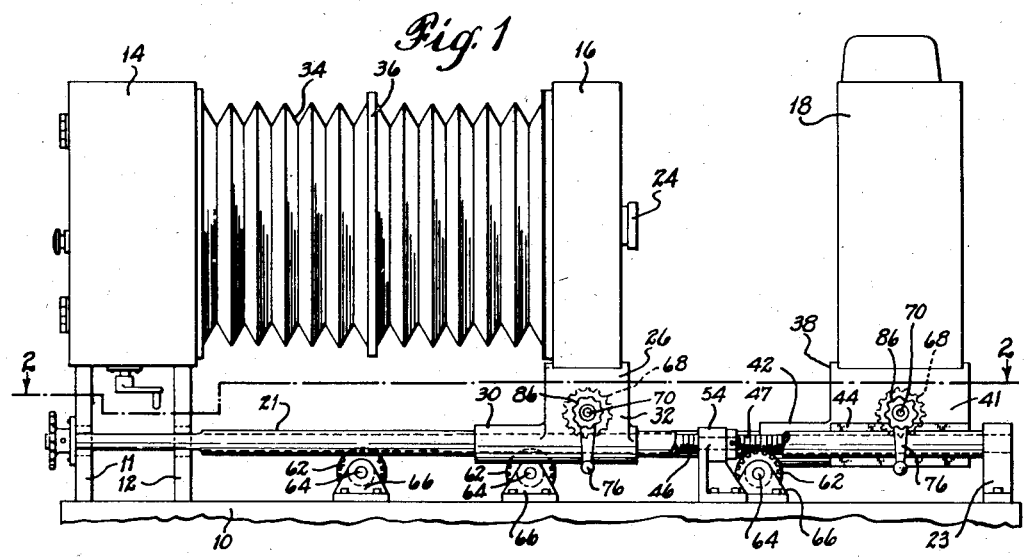
Figure 1 is a side elevation of a typical camera and its focusing means in accordance with the present invention, certain parts being broken away.
Figure 2:
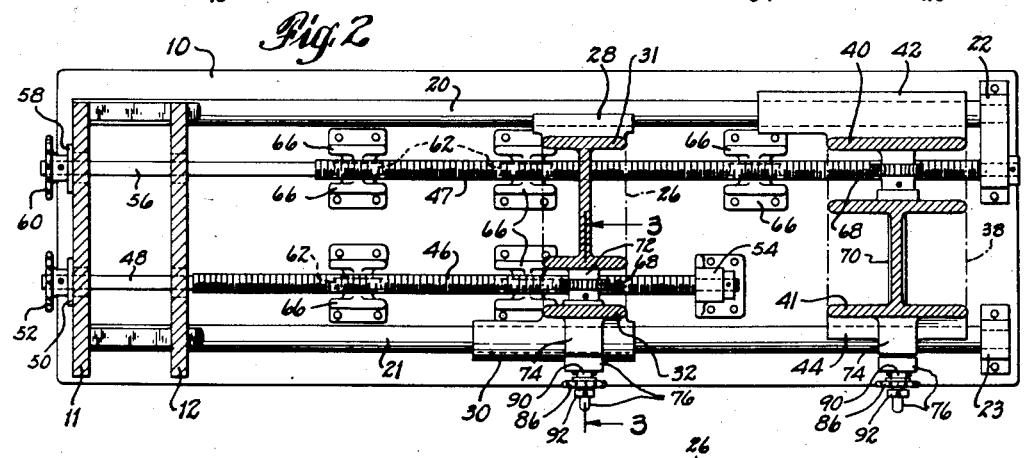
Figure 2 is a plan section as viewed along the line 2—2 of Figure 1.
Figure 3:
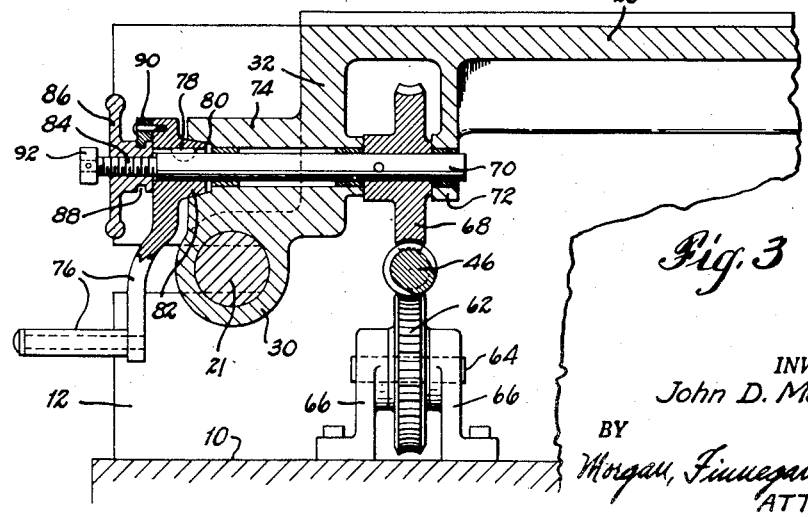
Figure 3 is an enlarged, fragmentary section taken along the line 3—3 of Figure 2 and showing certain details of the focusing means.

Referring now in detail to the present preferred and illustrative embodiment of the invention as shown in the accompanying drawings, the camera is firmly supported on a base 10 having at the rear end thereof, left in Figure 1, a pair of spaced upright plates or brackets 11, 12 which extend transversely to the base 10. Secured to the top edges of plate 11, 12 is a housing 14 for containing and supporting the usual sensitized element with its handling means and the usual ground glass for image observation in a fixed relation to the base 10.

Provision is made for slidably supporting a lens housing 16 and copy frame 18 on the base 10 in operative alignment with each other and the housing 14. As embodied, a pair of slide bars 20, 21 are arranged parallel to each other and the lens axis and along the longitudinal margins of the top of base 10. Bars 20, 21 are rigidly secured in spaced relation above the base 10 by having rear ends fixed in the upright plates 11, 12 and their opposite ends fixed in brackets 22, 23 mounted on the forward end of base 10.

The lens housing 16, carrying the lens 24 and other conventional mechanism associated therewith, may be removably fixed on a platform 26. Platform 26 is slidably supported on slide bars 20, 21 by means of bearing members 28, 30 arranged along and depending from the sides 31, 32 of the platform. Bearing member 28 may be half cylindrical to reduce friction but bearing member 30 provides a full cylindrical bearing on bar 21 and may be considerably longer than member 28 to insure maintenance of alignment.

The lens housing 16 is operatively joined to the housing 14 by the usual bellows 34 and intermediate bellows frame 36.

The subject or copy frame 18 is also slidably supported on the bars 20, 21. A platform 38 is provided on which the copy frame 18 may be removably fixed. Platform 38 has depending sides 40, 41 terminating in bearing members 42, 44 which engage slide bars 20, 21. As in the case of bearing members 28, 30 on platform 26, bearing member 44 may be half cylindrical and bearing member 42 may be full cylindrical and longer than member 44. However, in each case the full cylindrical bearing is on the side of the platform closest to the means, to be described later, for moving that platform.

Means for individually and independently sliding platforms 26 and 38 along bars 20, 21 are provided to bring the lens housing 16 and the copy frame 18, supported thereon, into proper relative position to produce a sharply focused image of the desired size on the ground glass and sensitized element carried in fixed housing 14. As embodied a pair of single thread worms 46 and 47 are provided which may be conveniently mounted between and parallel to the bars 20, 21. The worm 46, provided for movement of the lens housing 16, is rotatably mounted on base 10, adjacent to bar 21, and extends beneath and forward of platform 26 a sufficient distance to allow maximum forward adjustment of the lens housing 16. The rear portion 48 of worm 46 is unthreaded and journalled in a flanged bushing 50 fixed in upright plate 11. A hand wheel 52, fixed on the projecting end of rear portion 48 provides means for manually rotating the worm 46. The forward end of worm 46 is journalled in a pillow block 54 secured to the base 10.

The worm 47, provided for movement of copy frame 18, is similar to worm 46 but is adjacent bar 20 and extends beneath both platforms 26 and 38. The rear, unthreaded end 56 is journalled in a flanged bushing 58 which is fixed in plate 11, and the forward end is journalled in the bracket 22 which also supports the forward end of bar 20. Rotation of worm 47 is accomplished by means of a hand wheel 60 fixed on the projecting end portion 56 of the worm. Clearance holes may be provided in plate 12 for the passage of worms 46, 47 therethrough. If desired the bushings 50 and 58, pillow block 54 and the worm journal in bracket 22 may be provided with anti-friction bearings.

Although the worms 46 and 47 may be relatively large in diameter their necessary length subjects them to appreciable and undesirable sag between their end supports. Conventional intermediate bearings cannot be used because they would prevent the passage along the worms of any type of threaded or toothed member associated with the platforms to be moved. Saddle or half bearings, while permitting passage thereover of certain types of worm cooperating devices, are objectionable because of the degree of inherent friction involved and their exposure to wear and friction producing dirt. These objections are overcome in the illustrated invention by supporting the worms 46, 47 at a plurality of intermediate points on worm gears 62 which are freely rotatable on stub shafts 64 fixed in supporting brackets 66 arranged on each side of each worm gear 62. Brackets 66 are secured on the base 10. Thus, worms 46 and 47 are adequately supported at necessary points to prevent sagging of their axes and any resistance to rotation at the point of support is reduced to a minimum by the freely rotatable worm gears 62 which give this support.

Means are provided for operatively connecting the lens housing platform 26 and the copy frame platform 38 to their individual worms 46 and 47 so that they may be independently moved with respect to each other and to the fixed housing 14. Two adjustments for each platform are provided for obtaining the desired image size and sharpness of focus, one for rapid and coarse positioning of the lens and copy, during which it is unnecessary for the operator to observe the image on the ground glass and the other for a slower, minute movement of the lens and/or copy to sharpen the image and bring it to the exact desired size while it is under observation. Substantially duplicate mechanisms connect each platform 26 and 38 to its associated worm and therefore a description of one such mechanism is deemed sufficient for a complete understanding of the invention.

As embodied, the connecting and actuating mechanism comprises a worm gear 68 mounted on the underside of each platform 26 and 38 and in operative engagement with its respective worm 46, or 47. Worm gear 68 is fixed on the inner end of a laterally extending shaft 70 which is journalled beyond the inner side of worm gear 68 in a boss 72 formed as part of the understructure of the platform 26, or 38. The outer portion of shaft 70 is journalled in a boss 74 joined to the depending side 32, or 34, and the upper surface of the bearing member 30, or 44, of the platforms.

Rotation of the shaft 70 and hence worm gear 68 may be accomplished by turning a crank handle 76 which is slidably splined on the outer portion of shaft 70, as by a key 78. Thus, manipulation of the crank handle 76, when the worm 46, or 47, is stationary, serves to roll the worm gear 68 along the worm in the nature of a rack and pinion and hence rapidly moves the platform 26, or 38, in the desired direction and amount along the slide bars 20, 21.

Means for positively locking shaft 70 and worm gear 68 against rotation are provided so that, in this condition, the rotation of worm 46, or 47, reacts with the teeth of worm gear 68, as with a nut, to slowly and accurately move the platform 26, or 38, to its final position and thus obtain the sharp focus and image size desired. As embodied, the outer end of boss 74 is provided with an inwardly tapered recess 80 in which a correspondingly tapered hub 82 on crank handle 76 is adapted to be firmly and positively wedged. Shaft 70 has a reduced, threaded outer end 84 on which an internally threaded hand wheel 86 is mounted. The hub of hand wheel 86 is provided with an annular groove 88 into which the projecting lip of a shoe 90 extends. Shoe 90 is secured on the outer face of the crank handle 76. A collar 92 may be removably pinned on the end of the threaded portion 84 of shaft 70 to prevent accidental removal of hand wheel 86 and crank handle 76.

Thus, since shaft 70 is held against axial movement by worm gear 68, rotation of hand wheel 86, while the crank handle 76 is held against rotation serves to slide the crank hub 82 either into or out of engagement with the tapered recess 80. When out of engagement, worm gear 68 may be rotated and the rapid, coarse positioning of platform 26, or 38, obtained. When in engagement, worm gear 68 is positively locked against rotation and the turning of worm 46, or 47, will produce the slower, fine adjustment of the platform 26, or 38.

In operation the copy or subject matter to be reproduced is secured in place in copy frame 18, the lens 24 opened and the ground glass in fixed housing 14 exposed for observation. The operator then actuates both hand wheels 86 so as to disengage the crank handles 76 from their locked position. Either or both handles 76 are then rotated to move lens 24 and copy frame 18 to a position which, in the judgment of the operator, assisted by conventional scales (not shown), will produce the desired size image on the ground glass in housing 14. The crank handles 76 are then locked in this position by manipulating hand wheels 86.

Moving to the rear of the camera, the operator may then observe the image on the ground glass and, at the same time, rotate either or both hand wheels 52 and 60 and their respective worms 46 and 47 thereby bringing the image into sharp focus and desired size by the resulting minute movement of lens housing 16 and/or copy frame 18. The conventional procedure for making the reproduction may then take place.

The invention in its broader aspects is not limited to the specific mechanisms shown and described but departures may be made therefrom within the scope of the accompanying claims without departing from the principles of the invention and without sacrificing its chief advantages.

What is claimed is:

1. In a dark room camera having a bed, a housing for the sensitized material, a lens mounting and a copyboard, said lens mounting and copyboard being movable toward and away from the sensitized material and along said bed, and means for moving one of the movable elements comprising an elongated worm rotatable on and held against axial movement along the bed, a first worm gear freely rotatably mounted in a relatively friction-free mounting on the bed below said worm and meshing with the worm to support the worm whereby the worm is supported without interfering with the utility of the entire length thereof and without substantial frictional impedance, a second worm gear rotatably mounted on said movable element and means optionally locking it against rotation, said second worm gear being in mesh with the upper side of said worm whereby rotation of the second worm gear provides a coarse adjustment of said movable element, said first worm gear serving to hold said worm in close mesh with the second worm gear for thereby preventing sagging of the worm and resulting looseness and backlash due to such sagging, with resultant greater accuracy in focussing of the camera, and rotation of the worm while the worm gear is locked provides a fine adjustment of said movable element along the bed.

2. A dark room camera according to claim 1 in which a separate elongated worm, first and second worm gears, and locking means for the second worm gears are provided for the lens mounting and copyboard.

JOHN D. MAXWELL.

REFERENCES CITED

The following references are of record in the file of this patent:

UNITED STATES PATENTS

| Number | Name | Date |
|---|---|---|
| 1,847,010 | Koppe | Feb. 23, 1932 |